United States Patent [19]
Noji
[11] Patent Number: 4,786,788
[45] Date of Patent: Nov. 22, 1988

[54] TRANSACTION PROCESSING APPARATUS HAVING FUNCTION OF MANAGING THE NUMBER OF DAYS DURING WHICH COMMODITIES REMAIN UNSOLD

[75] Inventor: Hideaki Noji, Kusatsu, Japan

[73] Assignee: Omron Tateisi Electronics Co., Kyoto, Japan

[21] Appl. No.: 164,340

[22] Filed: Mar. 4, 1988

[30] Foreign Application Priority Data

Mar. 9, 1987 [JP] Japan ........ 62-53582

[51] Int. Cl.[4] ........ G06K 15/00
[52] U.S. Cl. ........ 235/383
[58] Field of Search ........ 235/379, 383

[56] References Cited

U.S. PATENT DOCUMENTS 4,608,487 8/1986 Awane ........ 235/383

*Primary Examiner*—Harold I. Pitts
*Attorney, Agent, or Firm*—Stevens, Davis, Miller & Mosher

[57] ABSTRACT

A PLU file stored in an RAM in an electronic cash register (ECR) is provided with a storage area for storing data concerning the number of days during which commodities remain unsold for each PLU code. A CPU provided in the ECR updates by one day all data concerning the number of days during which commodities remain unsold when the business of the day is shut up and clears data concerning the number of days during which commodities remain unsold corresponding to a PLU code inputted from a keyboard or a scanner when sales data of commodities purchased by a customer is registered. In addition, the CPU is responsive to a key operation of an operator for producing a report concerning the number of commodities on which the number of commodities counted corresponding to the number of days during which commodities remain unsold is printed and a report concerning unsold commodities on which name data of commodities which remain unsold for the designated days are printed, and the like.

6 Claims, 8 Drawing Sheets

81

| PLU CODE | NAME | UNIT PRICE | DEPARTMENT CODE | COMMODITY-UNSOLD DAYS | STATUS | AMOUNT | NUMBER-OF-COMMODITIES |
|---|---|---|---|---|---|---|---|
| | | | | | | | |
| | | | | | | | |
| | | | | | | | |

FIG.5
82
| COMMODITY-UNSOLD DAYS | NUMBER OF COMMODITIES |
|---|---|
| D(70) | 2 |
| D(71) | 5 |
| ⋮ | ⋮ |
| D( n ) | 10 |
FIG.6
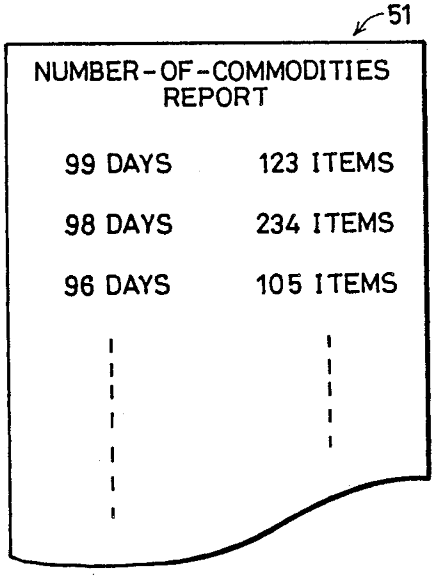
FIG.7
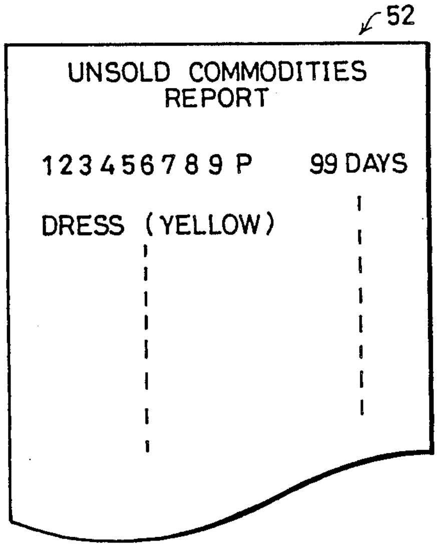

TRANSACTION PROCESSING APPARATUS HAVING FUNCTION OF MANAGING THE NUMBER OF DAYS DURING WHICH COMMODITIES REMAIN UNSOLD

BACKGROUND OF THE INVENTION

1. Field of the Invention

The present invention relates to a transaction processing apparatus and more particularly, to a transaction processing apparatus capable of managing the number of days during which commodities remain unsold (referred to as commodity-unsold days).

2. Description of the Prior Art

Commodities dealt in a shop comprises popular commodities and unpopular commodities. The demand for the popular commodities increases for a time. However, when commodities lose their popularity, the sales thereof falls off. In the distribution industry, a commodity whose sales fall off extremely, of the popular commodities is referred to as a poor seller. The poor seller which remains unsold in a counter or a warehouse prevents the effective use thereof. In addition, the shop has an inferior stock. Thus, it is very important for the shop to understand whether or not the commodities dealt in the step include a poor seller. In the shop, an elec:tronic cash register (referred to as ECR hereinafter) for registering sales information is installed. However, the conventional ECR does not have a function capable of easily understanding the poor seller. The conventional ECR has a function of issuing a report referred to as a minimum report or a zero report, as a similar function. The minimum report is a report on which commodities which sold a day are printed in the ascending order of the number of commodities sold. The zero report is a report on which commodities which did not sell at all a day are printed. Both reports are issued after the business of the day is shut up. Since data printed on the reports are only data handled a day, it can not be determined directly from the reports whether or not a commodity is a poor seller. In order to understand correctly whether or not the commodity is a poor seller, the data printed on the reports issued within a predetermined time period must be considered, which is complicated. In addition, in order to perform total processing or summing by a personal computer or the like to understand a poor seller, a memory having large capacity and a program having considerable capacity are required.

SUMMARY OF THE INVENTION

A primary object of the present invention is to provide a transaction processing apparatus capable of easily understanding a poor seller by managing commodity-unsold days.

Briefly stated, according to the present invention, the transaction processing apparatus comprising storing means capable of storing commodity identification data and data concerning commodity-unsold days corresponding thereto, updating means for updating the data concerning commodity-unsold days stored in the storing means, inputting means for inputting the commodity identification data, clearing means responsive to an input of the commodity identification data for clearing the data concerning commodity-unsold days stored in the storing means corresponding thereto, and outputting means responsive to the data concerning commodity-unsold days stored in the storing means for outputting information concerning commodities which remain unsold.

In accordance with another aspect of the present invention, the storing means comprises a storage area for storing sales data corresponding to commodity identification data. The transaction processing apparatus further comprises registering means responsive to the input of the commodity identification data for updating the sales data stored in the storing means, clearing means being responsive to the input of the commodity identification data for clearing the data concerning commodity-unsold days when the sales data is updated by the registering means.

In accordance with still another aspect of the present invention, the transaction processing apparatus further comprises counting means for counting the number of commodities corresponding to commodity-unsold days, the outputting means outputting the data concerning commodity-unsold days and data concerning the number of commodities corresponding thereto, in the descending order of the number of commodity-unsold days.

In accordance with still another aspect of the present invention, the transaction processing apparatus further comprises designating means for designating commodity-unsold days, the outputting means being responsive to designation of the commodity-unsold days for outputting commodity identification data corresponding thereto.

In accordance with a further aspect of the present invention, the transaction processing apparatus further comprises designating means for designating commodity-unsold days, the outputting means being responsive to designation of the commodity-unsold days for outputting commodity identification data of commodities which remain unsold for more than commodity-unsold days, together with the data concerning the commodity-unsold days, in the descending order of the number of commodity-unsold days.

In accordance with still another aspect of the present invention, the storing means comprises a storage area having information concerning the department of commodities stored corresponding to commodity identification data. The transaction processing apparatus further comprises designating means for designating. Commodity-unsold days and the department of commodities, the outputting means being responsive to designation of the commodity-unsold days and the department of commodities for outputting commodity identification data of a commodities which remain unsold for more than commodity-unsold days and corresponding to the designated department of commodities, together with the data concerning commodity-unsold days, in the descending order of the number of commodity-unsold days.

According to the present invention, a poor seller can be easily understood by a transaction processing apparatus such as an ECR installed in a shop wlthout using a personal computer or the like.

These objects and other objects, features, aspects and advantages of the present invention will beccme more apparent from the following detailed description of the present invention when taken in conjunction with the accompanying drawings.

BRIEF DESCRIPTION OF THE DRAWINGS

FIGS. 3A, 3B, 3C, 3D and 3E are diagrams for explaining a key operation of the keyboard shown in FIG. 2;

FIG. 5 is a diagram showing an area for storing the number of commodities included in the RAM shown in FIG. 1;

FIGS. 6 and 7 are diagrams showing reports issued by a printer shown in FIG. 1.

DESCRIPTION OF THE PREFERRED EMBODIMENTS

Figure 1:
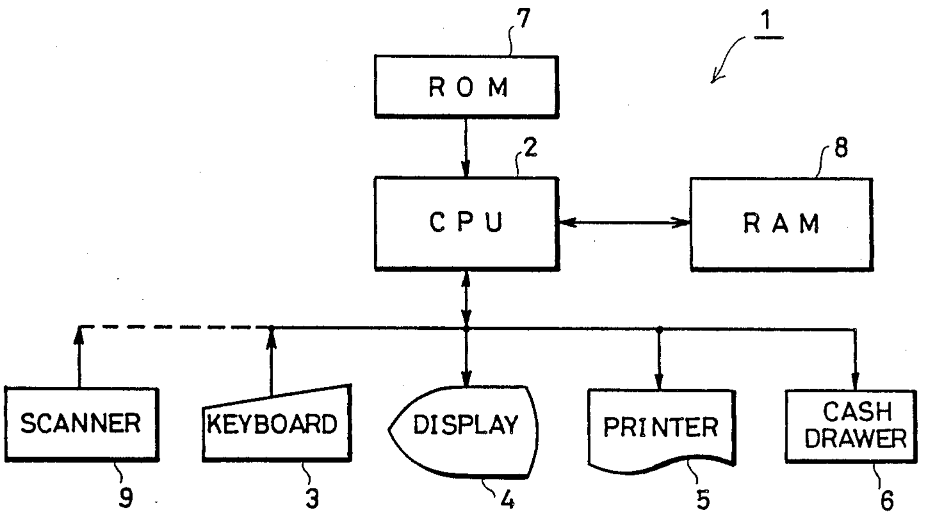
FIG. 1 is a schematic block diagram showing an electrical structure of an ECR according to an embodiment of the present invention.
Figure 2:
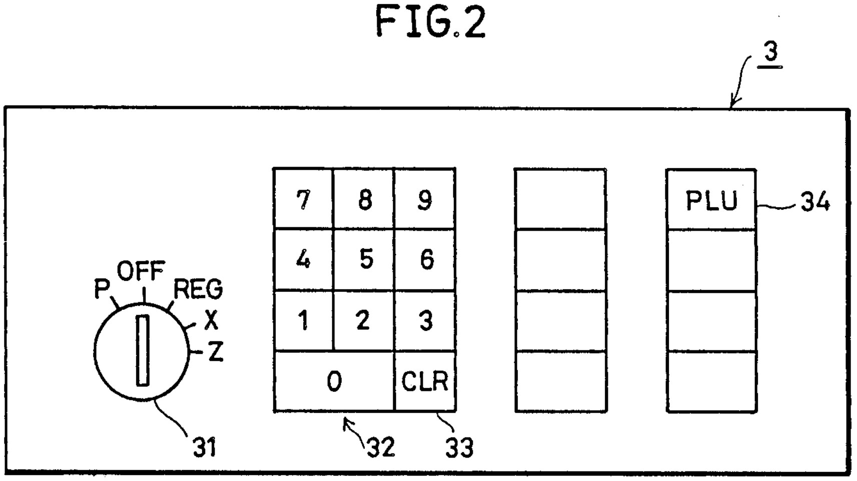
FIG. 2 is a diagram showing a key arrangement of a keyboard shown in FIG. 1.

FIG. 1 is a schematic block diagram showing an electrical structure of an ECR according to an embodiment of the present invention, and FIG. 2 is a diagram showing a key arrangement of a keyboard shown in FIG. 1. Referring now to FIGS. 1 and 2, description is made on a schematic structure of an embodiment of the present invention.

In FIG. 1, an ECR 1 is provided with a CPU 2. A keyboard 3, a display 4, a printer 5, a cash drawer 6, an ROM 7 and an RAM 8 are connected to the CPU 2. The keyboard 3 comprises a mode selecting switch 31, a ten-key 32, a clear key 33 and an PLU key 34, as shown in FIG. 2. The mode selecting switch 31 switches an operation mode to any of a P (program) mode, an REG (register) mode, an X (examination) mode, a Z (adjustment) mode or the OFF state. The REG mode is selected when register processing as will be shown in FIGS. 8B and 8C is performed. A Z mode is selected when adjustment processing as will be shown in FIG. 8A is performed. The adjustment processing is used for printing sales data handled a day and clearing the sales data sold stored in the RAM 8 and performed after the business of the day is shut off. The X mode is selected when examination processing as will be described in FIGS. 8D to 8G is performed. The ten-key 32 is used for inputting various codes such as a PLU code. The PLU code is used for identifying commodities. The clear key 33 is operated when the codes inputted from the ten-key 32 are corrected. The PLU key 34 is operated subsequently to the operation of the ten-key 32 when various codes are inputted from the ten-key 32. The display 4 is used for displaying data inputted from the keyboard 3 and the result operated by the CPU 2. The printer 5 is used for printing the data. The CPU 2 can control the printer 5 to produce reports as will be shown in FIGS. 6 and 7. The cash drawer 6 is used for receiving cash. The ROM 7 is used for storing an operation program of the CPU 2 based on flow charts as will be shown in FIGS. 8A to 8G. The RAM 8 comprises a PLU file as will be shown in FIG. 4 and an area for storing the number of commodities as will be shown in FIG. 5. The scanner 9 for reading bar codes attached to commodities may be connected to the CPU 2 so that the PLU code is inputted.

FIGS. 3A to 3E are diagrams for explaining a key operation of the keyboard shown in FIG. 2, where FIG. 3A shows a key operation to occur when the adjustment processing is performed, FIG. 3B shows a key operation to occur when data concerning the number of commodities corresponding to commodity-unsold days are outputted in the descending order of the number of commodity-unsold days, FIG. 3C shows a key operation to occur when commodity data (PLU codes and commodity name data and the like) of commodities which remain unsold for the designated days are outputted, FIG. 3D shows a key operation to occur when the commodity data of commodities which remain unsold for more than the designated days are outputted in the descending order of the number of commodity-unsold days, and FIG. 3E shows a key operation to occur when commodity data of commodities which remain unsold for more than the designated days with respect to the designated department are outputted in the descending order of the number of commodity-unsold days.

Figure 4:
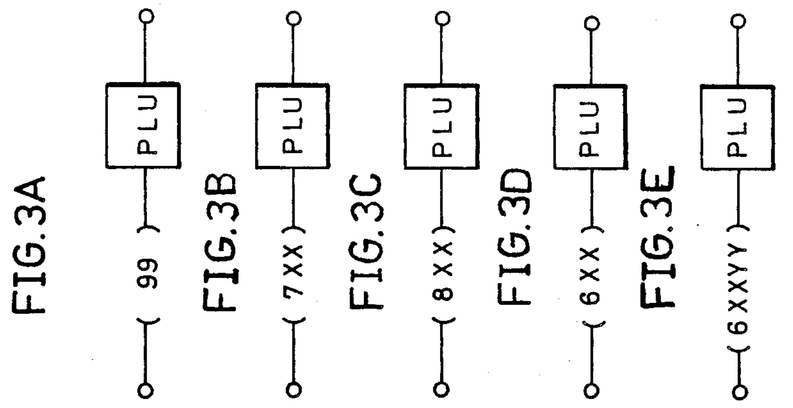
FIG. 4 is a diagram showing a PLU file stored in an RAM shown in FIG. 1.

FIG. 4 is a diagram showing a PLU file 81 stored in the RAM 8 shown in FIG. 1. In FIG. 4, a PLU code, name data, unit price data, a department code, data concerning commodity-unsold days, status data, amount data and number-of-commodities data are stored in the PLU file 81 for each commodity. The amount data indicates the amount sold for each commodity, and the number-of-commodities data indicates data concerning the number of commodities sold for each commodity. The amount data and the number-of-commodities data are updated every time the register processing is performed. 1 is added to the data concerning commodity-unsold days when the adjustment processing is performed and the data are cleared when the register processing is performed.

FIG. 5 is a diagram showing an area 82 for storing the number of commodities included in the RAM shown in FIG. 1. In FIG. 5, data concerning the number of commodities are stored in the storage area 82, in the descending order of the number of commodity-unsold days.

FIGS. 6 and 7 are diagrams showing reports issued by the printer 5 shown in FIG. 1, where FIG. 6 shows a report concerning the number of commodities and FIG. 7 shows a report concerning unsold commodities. The number of commodities corresponding to commodity-unsold days are printed on the report 51 concerning the number of commodities, in the descending order of the number of commodity-unsold days. The report 51 shown in FIG. 6 indicates that 123 commodity items remain unsold for 99 days, 234 commodity items remain unsold for 98 days and 105 commodity items remain unsold for 96 days. PLU codes and commodity name data of commodities which remain unsold for the designated days and data concerning commodity-unsold days are printed on a report 52 concerning unsold commodities. The report 52 concerning shown in FIG. 7 indicates that a yellow dress having a PLU code of "123456789" remains unsold for 99 days.

FIGS. 8A to 8G are flow charts for explaining an operation according to an embodiment of the present invention, where FIG. 8A shows adjustment processing, FIGS. 8B to 8C shows register processing and FIGS. 8D to 8G shows examination processing. Referring now to FIG. 1 to 8G, description is made on an operation according to an embodiment of the present invention.

(a) Adjustment Processing

Description is now made on adjustment processing shown in FIG. 8A. When the adjustment processing is performed, an operator switches the mode selecting switch 31 to the Z mode, operates the ten-key 32 as shown in Fig. 3A to input "99" and then, depresses the PLU key 34. The CPU 2 issues an adjustment report in response to the key operation, in the step S1. More specifically, the CPU 2 reads out every commodity a PLU code, name data, amount data and number-of-commodities data from the PLU file 81 and prints the data by the printer 5. The operation is performed with respect to all commodities stored in the PLU file 81. Subsequently, in the step S2, the CPU 2 clears all amount data and all number-of-commodities data stored in the PLU file 81, for the purpose of initializing a memory to perform register processing the next day. Then, the CPU 2 examines whether or not the data are normally cleared. If the data is normally cleared, 1 is added to data concerning commodity-unsold days stored in the PLU file 81, in the step S4. The operation allows the data concerning commodity-unsold days to be updated.

(b) Register Processing

Description is now made on register processing shown in FIGS. 8B and 8C. FIG. 8C is a diagram showing in detail the step of the register processing shown in FIG. 8B. When the register processing is performed, the operator switches the mode selecting switch 31 to the REG mode. The operator inputs the PLU code using the keyboard 3 or the scanner 9. When the PLU code is inputted using the keyboard 3, the operator inputs the PLU code from the ten-key 32 and then, depresses the PLU key 34. When the PLU code is inputted in the step S111, the CPU 2 searches the PLU file 81 in the step S112. Subsequently, in the step S113, the CPU 2 determines whether or not the same code as the inputted PLU code exists in the PLU file 81. If the same PLU code exists in the PLU file 81, the program proceeds to the step S114. In the step S114, the CPU 2 reads out unit price data and name data corresponding to the PLU code from the PLU file 81, displays the same by the display 4 and prints the same by the printer 5. Then, the CPU 2 updates amount data and number-of-commodities data corresponding to the PLU code stored in the PLU file 81. On the other hand, if the same PLU code does not exist, the program proceeds to the step S115, where the operator inputs the PLU code and the unit price data from the keyboard 3. In the step S116, the CPU 2 displays the inputted PLU code and the unit price data by the display 4 and prints the same by the printer 5. Subsequently, in the step S12 shown in FIG. 8B, data concerning commodity-unsold days corresponding to the inputted PLU code are cleared. As described above, since the data concerning commodity-unsold days for each commodity in the PLU file 81 are updated every day if the commodity is not purchased and cleared to zero if the commodity is purchased, the data concerning commodity-unsold days indicates the time period during which commodities are not sold. Thus, it can be easily understodd whether or not the commodity is a poor seller by outputting the data concerning commodity-unsold days. Meanwhile, with respect to a commodity the PLU code of which does not exist in the PLU file 81, the PLU code inputted from the keyboard 3 may be stored in the PLU file 81 and the data concerning commodity-unsold days corresponding to the PLU code may be stored therein. In the above described manner, data concerning commodity-unsold days can be understood irrespective of whether or not commodity identification data is registered in the PLU file 81.

(c) Examination Processing

Examination processing comprises examining processing (FIG. 8D) for examining the number of commodities which remain unsold and unsold commodities examining processing (FIGS. 8E, 8F and 8G) for examining what commodities remain unsold. In addition, the unsold commodities examining processing comprises first unsold commodities examining processing (FIG. 8E) for outputting commodity data of commodities which remain unsold for the designated days, second unsold commodities examining processing (FIG. 8F) for outputting commodity data of commodities which remain unsold for more than the designated days, in the descending order of the number of commodity-unsold days, and third unsold commodities examining processing (FIG. 8G) for outputting commodity data of commodities which remain unsold for more than the designated days with respect to a designated department, in the descending order of the number of commodity-unsold days.

Figure 8D:
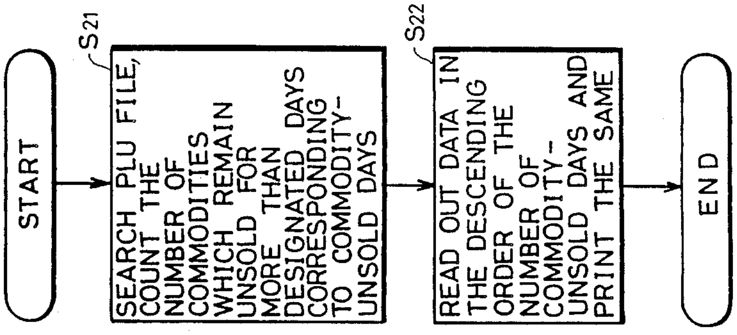
FIGS. 8A, 8B, 8C, 8D, 8E, 8F and 8G are flow charts for explaining an operation according to an embodiment of the present invention.
Figure 8B:
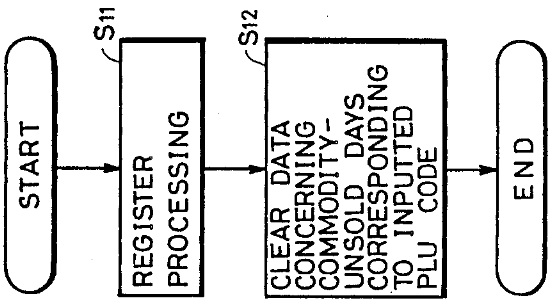
Figure 8A:
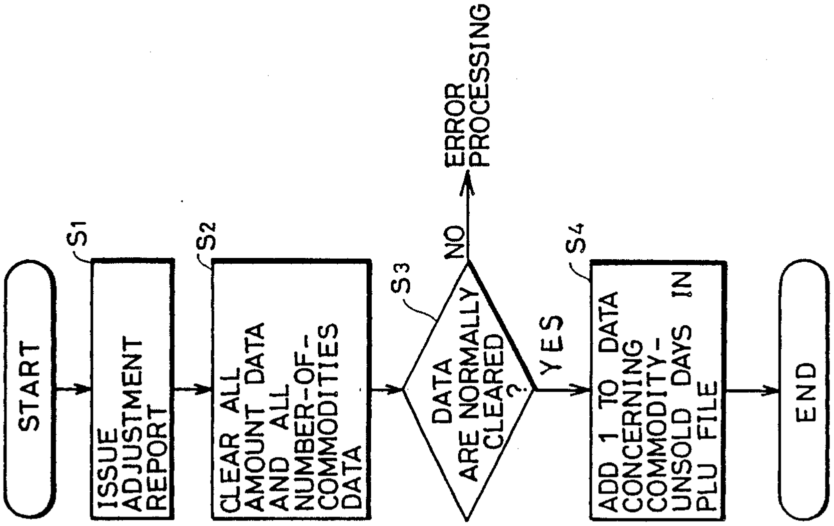
Figure 8C:
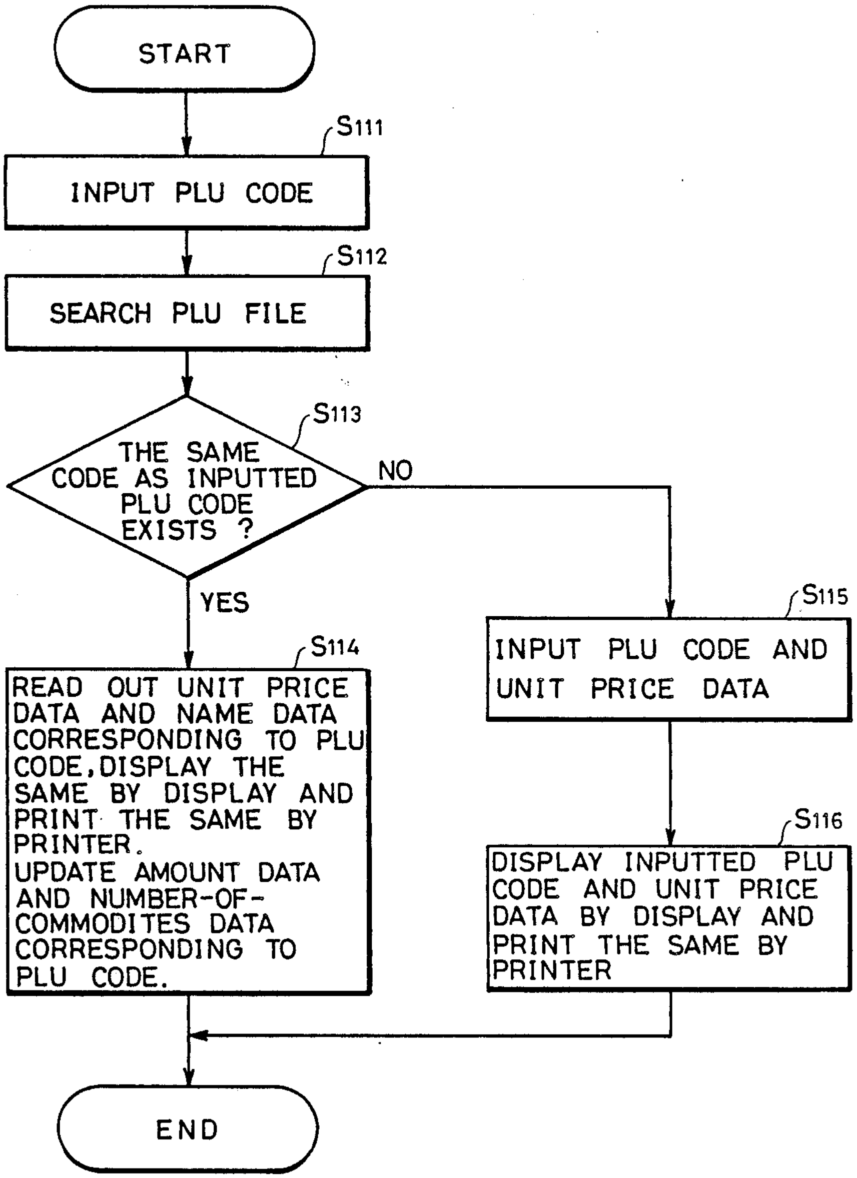

Description is now made on the number-of-commodities examining processing shown in FIG. 8D. When any of the above described examination processing is performed, the operator switches the mode selecting switch 31 to the X mode. When the number of commodities which remain unsold is examined, the operator operates the ten-key 32 as shown in FIG. 3B to input "7XX" and then, depresses the PLU key 34. "XX" represents an arbitrary number of commodity-unsold days. Commodities which remain unsold for more than the number of days are examined. In the step S21, the CPU 2 is responsive to the key operation for searching the PLU file 81, counting the number of commodities which remain unsold for more than the designated days corresponding to commodity-unsold days and updating the data concerning the number of commodities stored in the storage area 82. Subsequently, in the step S22, the CPU 2 reads out data in the descending order of the number of commodity-unsold days and prints the same and issues the report 51 concerning the number of commodities as shown in FIG. 6. The operator can know the number of commodities corresponding to commodity-unsold days by the report 51 shown in FIG. 6.

Figure 8E:
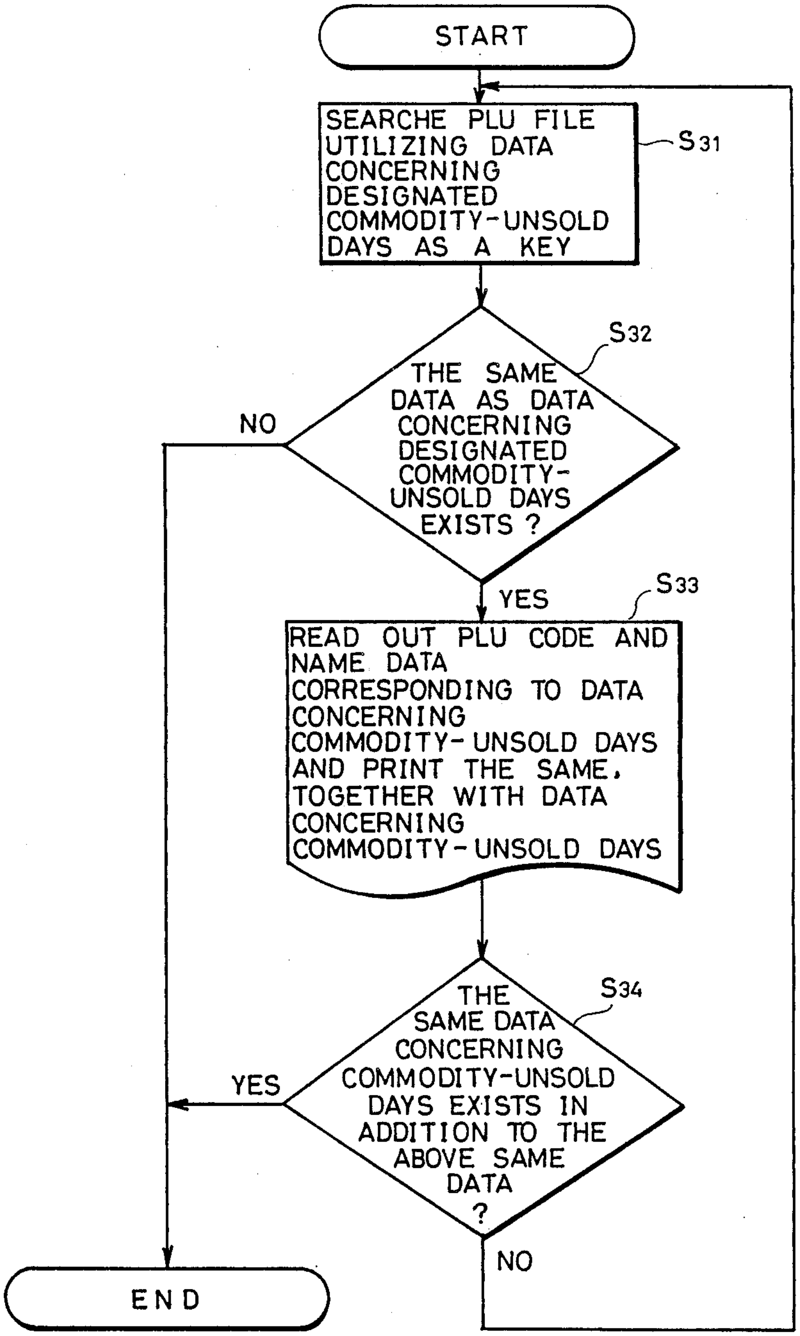
Figure 8F:
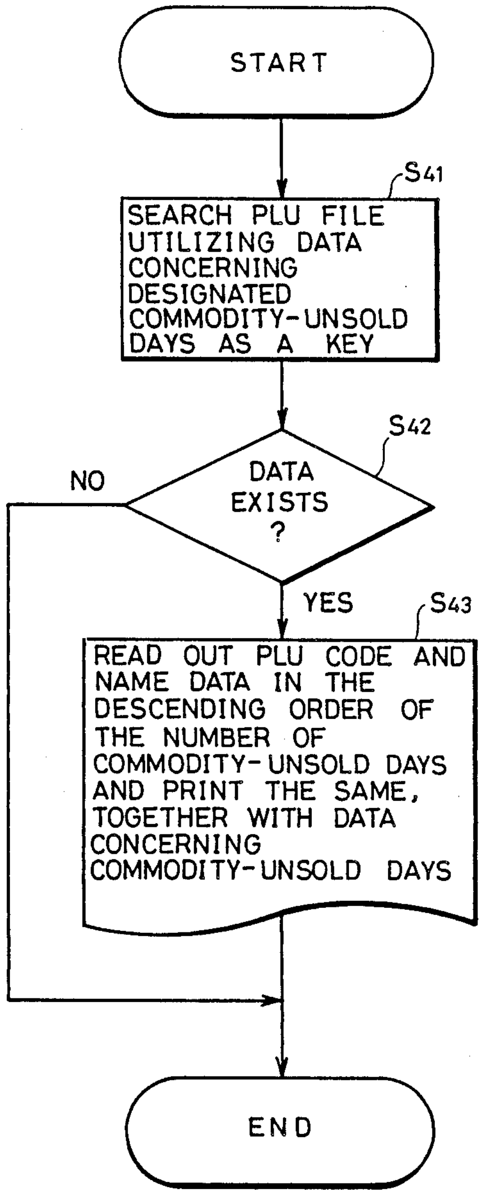

Description is now made on the first unsold commodities examining processing shown in FIG. 8E. In this case, the operator performs the key operation shown in FIG. 3C. More specifically, the operator operates the ten-key 32 to input "8XX" and then, depresses the PLU key 34. "XX" represents commodity-unsold days. When this key operation is performed, the CPU 2 searches the PLU file 81 utilizing data concerning the designated commodity-unsold days as a key in the step S31 and determines whether or not the same data as the data concerning the designated commodity-unsold days exists in the PLU file 81 in the step S32. If the same data concerning commodity-unsold days does not exists, the operation is completed. On the other hand, if the same data concerning commodity-unsold days exists, the CPU 2 reads out from the PLU file 81 a PLU code and name data corresponding to the data concerning the designated commodity-unsold days and prints the same, together with the data concerning commodity-unsold days in the step S33. Subsequently, in the step S34, the CPU 2 determines whether or not the same data concerning commodity-unsold days exists in addition to the above described same data. If the same data does not exists, the operation is completed. On the other hand, if the same data exists, the program proceeds to the step S31. Subsequently, the above described operation is repeated. In the above described manner, the report 52 concerning unsold commodities as shown in FIG. 7 is issued. The operator can understand unsold commodities by the report 52 concerning unsold commodities shown in FIG. 7.

Description is now made on the second unsold commodities examining processing shown in FIG. 8E. In this case, the operator performs the key operation shown in FIG. 3D. More specifically, the operator operates the ten-key 32 to input "6XX" and then, depresses the PLU key 34. "XX" represents commodity-unsold days. When the key operation is performed, the CPU 2 searches the PLU file 81 utilizing data concerning the designated commodity-unsold days as a key in the step S41 and determines whether or not data concerning commodity-unsold days more than the designated commodity-unsold days exists in the PLU file 81 in the step S42. If the data does not exist, the operation is completed. On the other hand, if the data exists, the CPU 2 reads out the PLU code, the name data and the like, in the descending order of the number of commodity-unsold days and prints the same, together with the data concerning commodity-unsold days in the step S43. Before the first unsold commodities examining processing is performed, processing for examining the number of commodities must be always performed and commodity-unsold days must be understood so as to designate commodity-unsold days. However, in the second unsold commodities examining processing, unsold commodities can be easily understood without understanding commodity-unsold days.

Figure 8G:
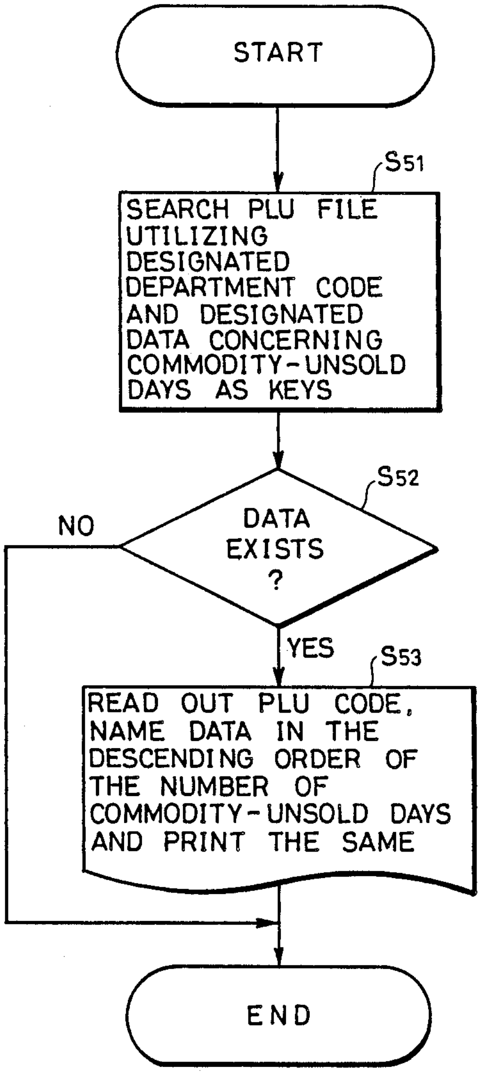

Description is now made on the third unsold commodities examining processing shown in FIG. 8G. In this case, the operator performs the key operation shown in FIG. 3E. More specifically, the operator performs the ten-key 32 to input "6XXYY" and then, depresses the PLU key 34. "XX" represents commodity-unsold days and "YY" represents a department code. When the key operation is performed, the CPU 2 searches the PLU file 81 utilizing the designated department code and the designated data concerning commodity-unsold days as keys in the step S51 and determines whether or not data corresponding to data concerning commodities in the designated department and concerning commodities which remain unsold for more than the designated days exists in the PLU file 81 in the step S52. If the data does not exist, the operation is completed. On the other hand, if the data exists, the PLU code, the name data and the like are read out in the descending order of the number of commodity-unsold days and prints the same, together with the data concerning commodity-unsold days in the step S53. In the above described manner, the operator can understand unsold commodities for each department and thereby can easily know, for example, timing in replacing seasonal commodities.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A transaction processing apparatus capable of managing the number of days during which commodities remain unsold, comprising:

storing means capable of storing commodity identification data and data concerning the number of days during which commodities remain unsold corresponding thereto, updating means for updating the data concerning the number of days during which commodities remain unsold stored in said storing means, inputting means for inputting the commodity identification data, clearing means responsive to an input of the commodity identification data for clearing the data concerning the number of days during which commodities remain unsold stored in storing means corresponding thereto, and outputting means responsive to the data concerning the number of days during which commodities remain unsold stored in said storing means for outputting information concerning commodities which remain unsold.

2. A transaction processing apparatus according to claim 1, wherein said storing means comprises a storage area for storing sales data corresponding to commodity identification data, and which further comprises registering means responsive to the input of the commodity identification data for updating the sales data stored in said storing means, said clearing means being responsive to the input of the commodity identification data for clearing the data concerning the number of days during which commodities remain unsold when the sales data is updated by said registering means.

3. A transaction processing apparatus according to claim 1, which further comprises counting means for counting the number of commodities corresponding to the number of days during which commodities remain unsold, said outputting means outputting the data concerning the number of days during which commodities remain unsold and data concerning the number of commodities corresponding thereto, in the descending order of the number of days during which commodities remain unsold.

4. A transaction processing apparatus according to claim 1, which further comprises designating means for designating the number of days during which commodities remain unsold, said outputting means being responsive to designation of the number of days during which commodities remain unsold for outputting commodity identification data corresponding thereto.

5. A transaction processing apparatus according to claim 1, which further comprises designating means for designating the number of days during which commodities remain unsold, said outputting means being responsive to designation of the number of days during which commodities remain unsold for outputting commodity identification data of commodities which remain unsold for more than days during which commodities remain unsold, together with the data concerning the number of days during which commodities remain unsold, in the descending order of the number of days during which commodities remain unsold.

6. A transaction processing apparatus according to claim 1, wherein said storing means comprises a storage area having information concerning the department of commodities stored corresponding to commodity identification data, which further comprises designating means for designating the number of days during which commodities remain unsold and the department of commodities, said outputting means being responsive to designation of the number of days during which commodities remain unsold and the department of commodities for outputting commodity identification data of commodities which remain unsold for more than days during which commodities remain unsold and corresponding to the designated department of commodities, together with the data concerning the number of days during which commodities remain unsold, in the descending order of the number of days during which commodities remain unsold.

* * * * *